United States Patent [19]

Berthold et al.

[11] Patent Number: 5,340,989
[45] Date of Patent: Aug. 23, 1994

[54] MULTIPLE COUNTER FOR DETECTING RADIOACTIVE RADIATION

[75] Inventors: Fritz Berthold, Pforzheim; Manfred Pfleger, Wildbad, both, Fed. Rep. of Germany

[73] Assignee: Laboratorium Prof. Dr. Rudolf Berthold GmbH & Co. KG, Wildbad, Fed. Rep. of Germany

[21] Appl. No.: 982,690

[22] Filed: Nov. 30, 1992

[30] Foreign Application Priority Data

Nov. 29, 1991 [DE] Fed. Rep. of Germany ....... 4139369

[51] Int. Cl.$^5$ ............................................. G01T 1/185
[52] U.S. Cl. .................................. 250/385.1; 250/374
[58] Field of Search .............................. 250/374, 385.1

[56] References Cited

PUBLICATIONS

Hawkesworth et al., "A Positron Camera for Industrial Application", Nucl. Instrum. & Methods in Phys. Res., A253, 1986, pp. 145–157.

*Primary Examiner*—Carolyn E. Fields
*Attorney, Agent, or Firm*—Spensley Horn Jubas & Lubitz

[57] ABSTRACT

A counting tube for detecting radioactive radiation exclusively uses cathode pads for signal detection, which are disposed electrically insulated on the interior of an inner wall of the counting tube housing opposite the sample. A discrete electronic evaluation element is preferably allocated to each cathode element, which makes possible parallel evaluation of the counting tube signal. The cathode pads are in particular laminated in the form of a metal-coated conductive surface on a support plate made of an insulating material. The field of application of such counting tubes with the exclusive use of cathode pads is in particular in connection with multiple counting tubes where the partial areas of a total area to be measured are intended to be individually detected and evaluated.

25 Claims, 12 Drawing Sheets

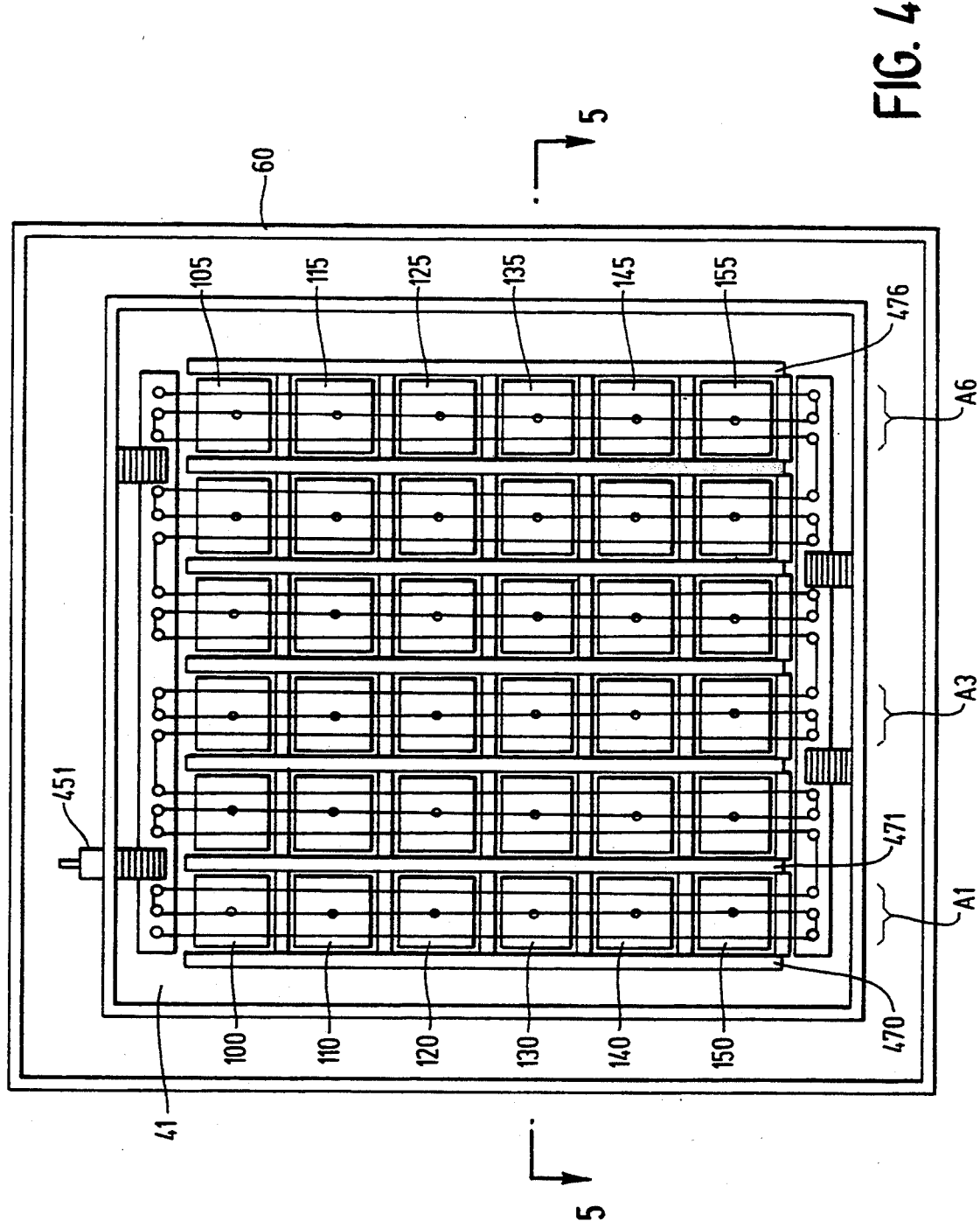

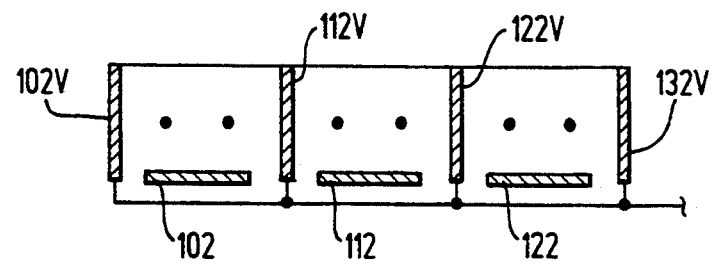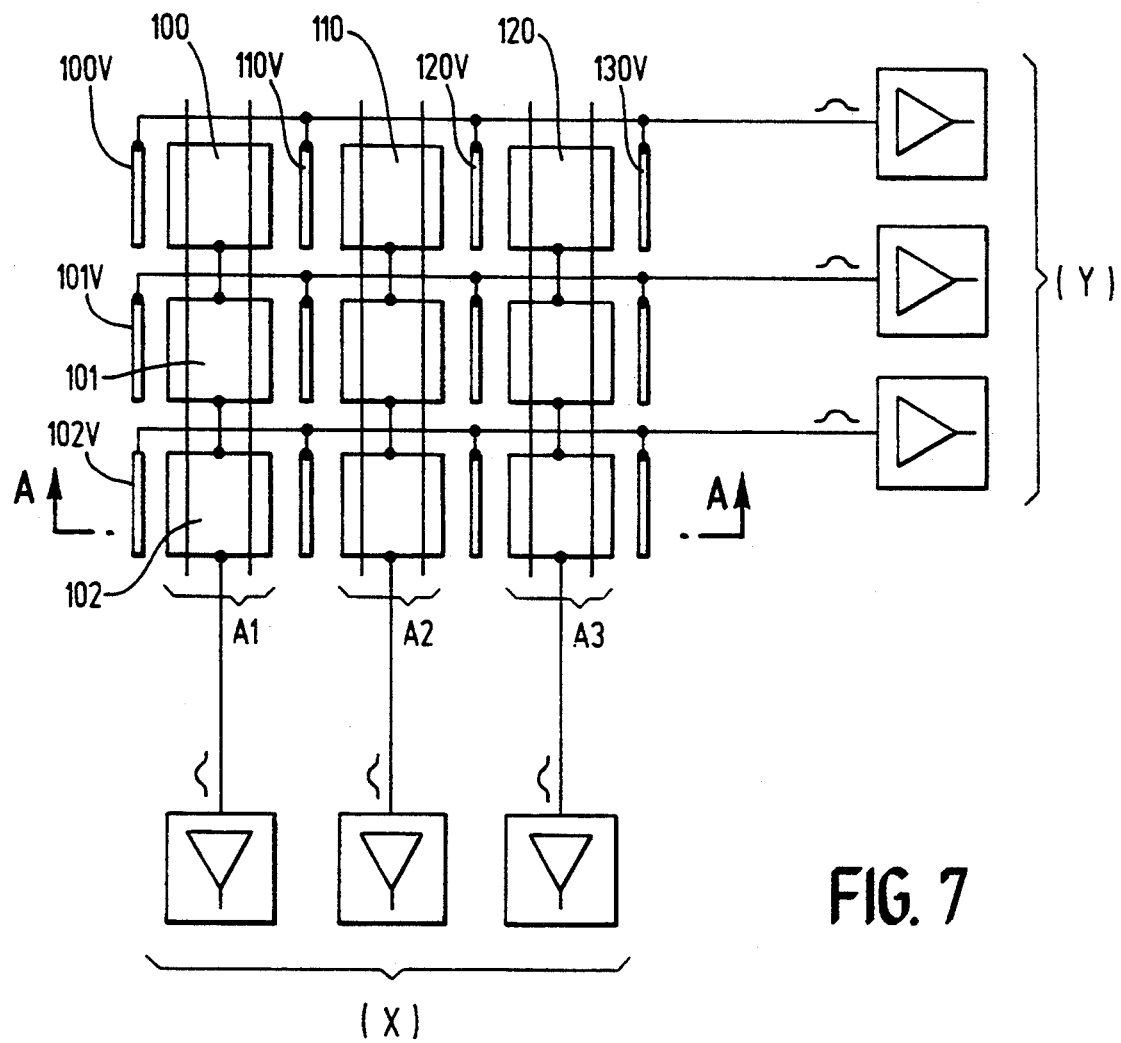
FIG. 7

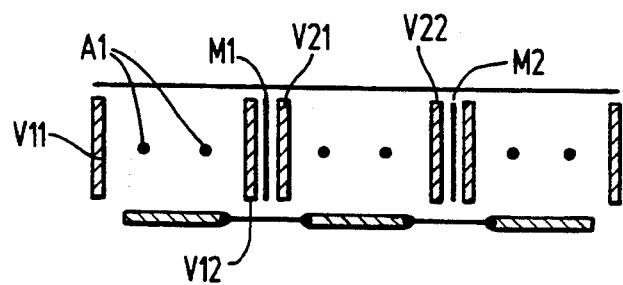
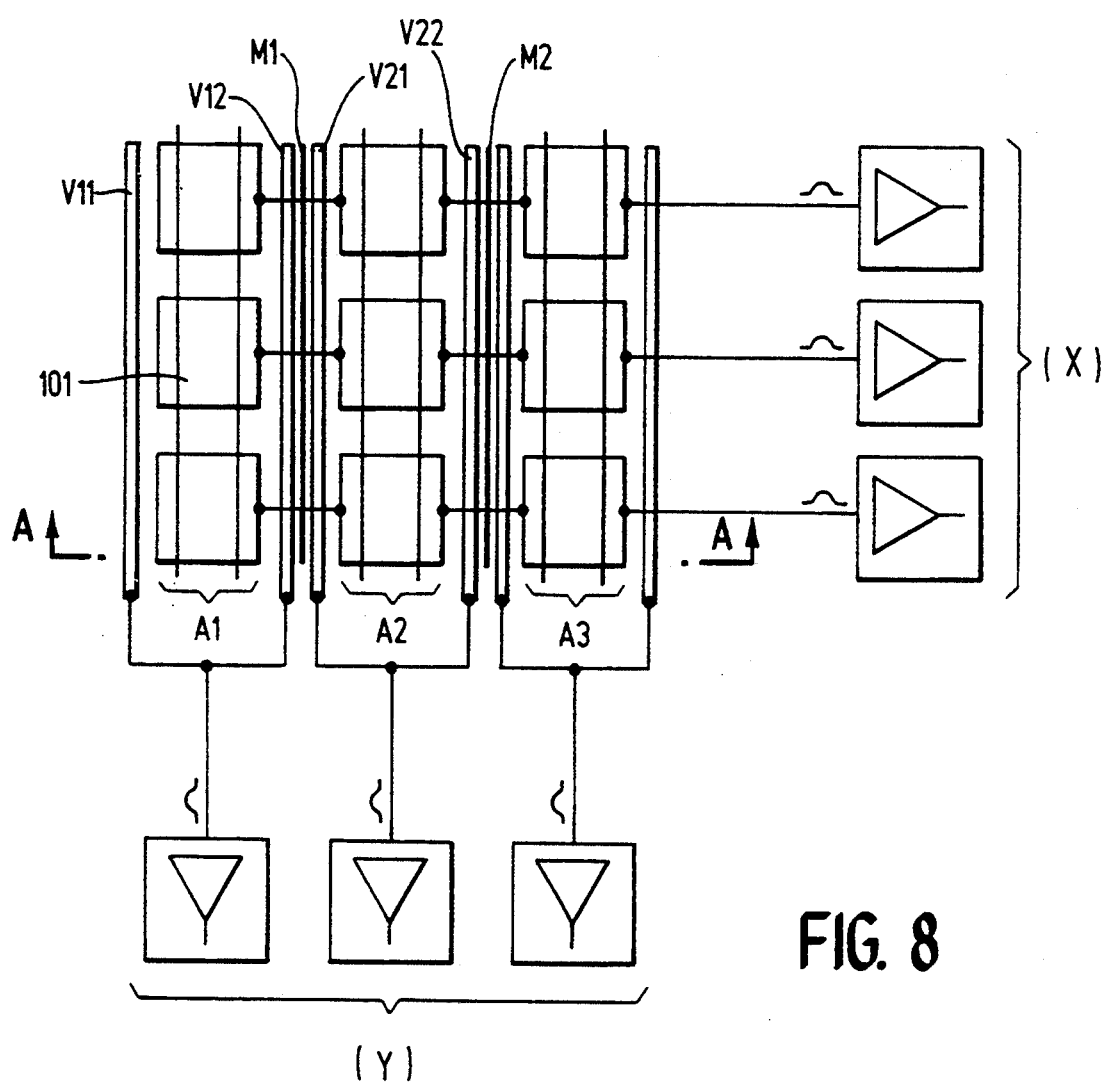
FIG. 8

MULTIPLE COUNTER FOR DETECTING RADIOACTIVE RADIATION

FIELD OF THE INVENTION

The invention relates to a multiple counter for detecting radioactive radiation by means of electrically conducting flat cathode elements which are separated from the radiation source by anode wires and are connected with an electronic evaluation element.

BACKGROUND OF THE INVENTION

A multiple counter of this type is disclosed in GB-A-2190787 for simultaneously detecting radioactivity from several samples which, for instance, are placed in sample dishes. In this case a substantially round, flat cathode element is allocated to each sample, several cathode elements are connected with each other to form rows and anode wires are stretched perpendicularly to such rows in such a way that an intersection point between a cathode element and an anode wire is formed above each sample. Thus a signal on a cathode element as well as that on an anode wire is required for decoding to show the radioactivity of a defined sample.

It is known that anode wire pulses are conducted with the aid of coupling capacitors which are connected to amplifiers. In this case each one of the coupling capacitors must withstand the high voltage of the counting tube and must not generate any interference pulses. The space requirements of the needed large number of coupling capacitors and their wiring is considerable on account of the required insulation.

OBJECT AND SUMMARY OF THE INVENTION

It is an object of the invention to improve particularly a multiple counter in such a way that evaluation of counting pulses can take place without the employment of anode wire signals, while maintaining at least the same detection sensitivity, and that this is made possible with a structurally simple design of the counting tube which can be adapted to several uses.

This object is attained in accordance with the invention by a multiple counter for detecting radioactive radiation from a radiation source, the counter including a plurality of electrically conducting flat cathode elements, a plurality of anode wires disposed between the radiation source and the cathode elements, and an electronic evaluation element connected to the cathode elements, wherein each cathode element is operatively associated with at least two anode wires; the cathode elements are disposed and connected for exclusively effecting signal detection; the electronic evaluation element comprises a plurality of structurally substantially identical amplification circuits each connected to at least one respective cathode element; and the counter further comprises a printed circuit board constituting a support element carrying the cathode elements and at which the cathode elements are connected to the amplification circuits.

With the attainment of this object, considerable space savings are achieved by omitting the coupling capacitors. These space savings permit a compact construction, particularly if the electronic evaluation element is formed by a number of structurally uniform pulse evaluation circuits which correspond to the number of cathode elements, each of which is individually connected with a cathode element allocated to the connector. If the pulse evaluation circuits have charge-or current-sensitive input stages, the voltage increase at the input is minimized and capacitive noise is prevented to a large degree.

In the multiple counter of the invention, a cathode element is allocated to each partial area to be measured or to each sample. This allows (in contrast to proportional counters) the direct and simultaneous measurement of each partial area (for example a sample dish) allocated to each cathode element. The allocation of at least two anode wires to each cathode element assures uniform responsiveness and use of the area of the cathode element, as well as a high signal amplitude.

It becomes particularly clear with this design that the space requirements of the above mentioned high voltage coupling capacitors alone would not allow attainment of the objects. For example, embodiments are required which cover 96 samples in a matrix-like grid of up to $9 \times 9$ mm$^2$.

If coded read-out (as in the proportional counting tube of GB-A-2190787) is desired, this concept can also be realized without difficulties if the second signal, which is absolutely required for defining sample location, is also generated by a cathode element. In this case two cathode elements of equal size which are combined in rows and columns would be allocated to each partial area to be measured, for example.

Both concepts (direct read-out and coded read-out) can be put into practice in a particularly advantageous manner if printed circuit board technology is employed for realizing the cathode elements and/or their allocated pulse evaluation circuits, i.e. if these circuits are embodied as printed circuits (multi-layered, if required), where the printed circuit board forms a support element, on the underside of which a metallic conducting layer is laminated to form one or more cathode elements. In this case additional designs are possible, such as the disposition of a portion of the amplifier circuits, including the switching and plug elements, on the other side of the printed circuit board by means of surface mount technology (SMT). All other circuit components are then combined into a compact electronic block on the exterior of the rear counting tube wall and are directly connected with the printed circuit board via printed circuit board plug connectors.

Proposals have already been put forth to design location-sensitive proportional counting tubes which do not use the anode wires for signal read-out. For example, DE-A-35 46 062 discloses a one-dimensionally location-sensitive counting tube operating in accordance with the charge-division method, where the cathode is formed from a plurality of metal strips placed parallel side-by-side and which, for example, can be produced on a substrate by means of printed circuit technology. In this form of construction, these cathode strips extend perpendicularly to the anode wire. They are connected in such a way that they form a resistance-sensitive cathode which is terminated at each end by an amplifier. Therefore, with a counting tube of this construction the expenditure for the amplifiers is insignificant. Use of the cathode strips described is also conceivable in connection with a two-dimensionally location-sensitive counting tube. In DE-A-35 46 062 it is merely proposed to embody the cathode as a two-dimensional matrix.

In contrast thereto, in connection with a two-dimensionally location-sensitive counting tube, it is proposed in U.S. Pat. No. 3,975,639 to provide two planes of cathode strips extending perpendicularly to each other on both sides of the anode wire, the signals of which can be individually evaluated with an amplifier by the coincidence method.

It has also been proposed to achieve two-dimensionally location-sensitive measurements with a special electrode pattern (Nuclear Instruments and Methods in Physics Research, A242 (1986), pp. 484–486, published by Elsevier Science Publications B.V., North-Holland Physics Publishing Division).

A further concept, disclosed in U.S. Pat. No. 4,622,467, provides to arrange a plurality of matrix-like disposed evaluation elements, or coding elements, on the cathode, the evaluation elements being connected in rows and columns with charge-sensitive amplifiers for evaluation and being capacitively separated from each other.

In this case the cathode consists of a support layer and the evaluation elements are applied in the form of a conductive material. An anode area is located opposite this cathode a short distance away. When a particle enters the space between the anode area and the cathode plate, the electrical charge formed on the anode area induces a signal in a plurality of oppositely located evaluation elements. The amplitudes of the signals of adjoining evaluation elements are then evaluated and the location of the initial event is determined from the concentration center of the amplitudes.

A two-dimensionally location-sensitive counter of a special construction is also described in IEEE Transactions on Nuclear Science, Vol. 36, No. 1, February 1989, where by use of printed circuit board technology the anode is constructed of thousands of elements (called "pads"), each one of which has been allocated an individual amplifier to assure rapid read-out of the individual "pixel pads".

Accordingly, for special uses expensive counting tube arrangements have been proposed for two-dimensionally location-sensitive measuring of radioactive events, which provide for the division of the anode or cathode into individual elements. In all cases the main emphasis is on as high a local resolution as possible in the mm range or below it, which naturally requires a very large number of such elements of small size, together with large expenditures for evaluation.

These previously known solutions are too expensive not only with respect to their counter structure, but also their electronic evaluation elements, for their efficient use as multiple counters with typical partial areas or sample areas in the range of 5 mm$^2$. In addition, the "doctoring" of a location-sensitive counting tube into a multiple counter, in which integration areas corresponding to the sample locations are formed, also has the disadvantage that because of electronic non-linearities and instabilities it is not always assured that the integration areas and the sample positions are completely congruent. Such problems do not exist for the direct detection in accordance with the invention.

A basic problem with multiple counters of the type to which the invention is directed is to assure that the radioactive radiation emanating from a partial area addresses the cathode element(s) which correspond as exclusively as possible to this partial area, i.e. that cross-talk effects are avoided. Such effects can either have an electrical source (by inducing pulses in adjacent circuit parts) or a radiation source (penetration of adjacent evaluation areas by radiation). To prevent the last mentioned cross-talk source, the proportional counting tube provides a collimator-like structure with bores, the interior walls of which are used for shielding the radiation of adjacent partial areas. However, such massive collimator installations are not without problems, particularly for detecting low-energy radiation such as $^3$H- or $^{14}$C-radiation, because they can increase the distance between the sample and the counting tube chamber and in this way reduce the detection sensitivity. This can also not completely be prevented by additional steps, such as suction fields or drift fields, particularly since these are also being impaired by such collimator arrangements.

The printed circuit board technology with the exclusive use of cathode pads has been shown to be very useful to prevent electricity-generated cross-talk. By applying preferably grounded strips to the printed circuit boards, which extend between the cathode elements, such undesirable effects can be prevented.

Alternatively or additionally to these strips, it is also possible to dispose radiation-absorbing intermediate walls between adjacent cathode rows inside the counting chamber, which effect not only electrical but also radiation shielding of adjacent evaluation areas.

Such intermediate walls can be disposed in a structurally particularly simple manner parallel to the anode wires, where they form a rib-like structure, which also adds to the mechanical reinforcement of the housing.

However, the above-mentioned strips can also be exclusively used for shielding and, in this case, together form a grid-like structure on the printed circuit board.

It is also possible to employ anti-coincidence circuits for adjacent cathode pads for eliminating radiation events which cannot be clearly allocated to a single partial area, such as background radiation or cross talk.

The consequent employment of cathode elements for measuring while using modern printed circuit board technology allows the design of multiple counters for various purposes.

As already explained above, multiple counters are counters in which the counting rate of partial areas of a total area to be measured are intended to be individually detected and evaluated. This can be a proportional counting tube in accordance with GB-A-2190787, where a plurality of samples in sample dishes are to be separated and simultaneously evaluated. But where the surface contamination of an area which may be of a size of 1 m$^2$, for example, is to be measured, it can also be a so-called large area counting tube. By dividing the total area (for example into 100 equal partial areas) and associating a cathode pad (for example of an area of 95 $\times$ 95 mm) with each partial area, a rough "location resolution" corresponding to the size of the allocated cathode pad is achieved on the one hand, which for example may be useful for localizing the contamination. On the other hand, it is possible, for example, to determine such a localized contamination with a higher detection sensitivity than in case of a measurement of the total area, because when limiting the evaluation to one (or a few) cathode pads, the evaluation of the useful signal is impaired only by a portion of background radiation corresponding to the portion of the area.

The "seamless" connection of the cathode pads additionally prevents dead areas, such as are inevitable in the intermediate and edge areas when using separate counting tubes, and thus assures a practically gap-free, area-covering evaluation of the radiation events.

In an extreme instance of the use of the teaching of the invention it is also possible to conceptualize a "single counting tube", where only a single cathode element has been provided, over which several anode wires have been stretched.

Such a single counter and exemplary embodiments of multiple counters will now be described in detail with reference to drawings.

BRIEF DESCRIPTION OF THE DRAWINGS

FIGS. 4 and 5 are a bottom view and a cross section, respectively, of a structural embodiment of a multiple counter with direct read-out in accordance with the illustration of FIG. 3.

FIGS. 7 and 8 are views of the principles of further possibilities for coded read-out with a multiple counter according to the invention.

DETAILED DESCRIPTION OF THE PREFERRED EMBODIMENTS

Figure 2:
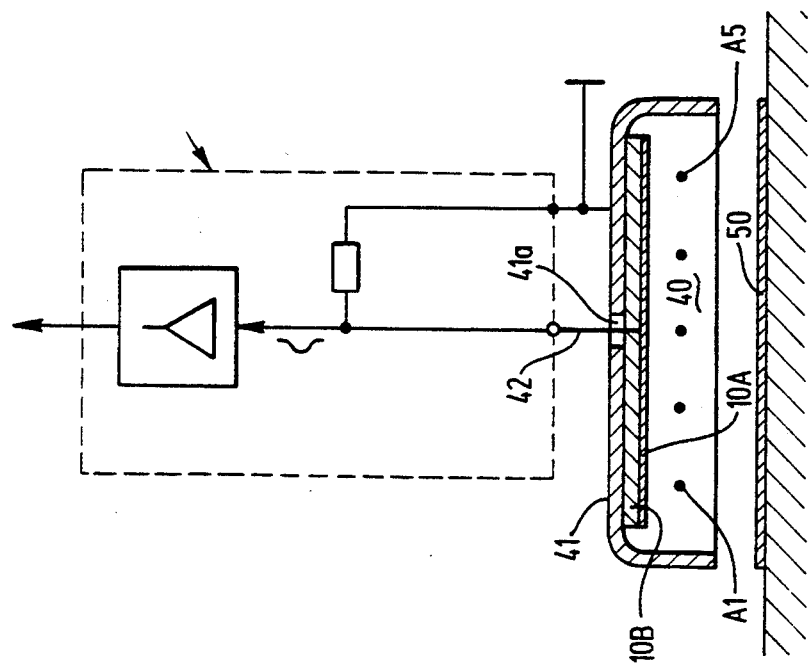
FIGS. 1 and 2 show an exemplary embodiment of a single counter according to the invention.
Figure 1:
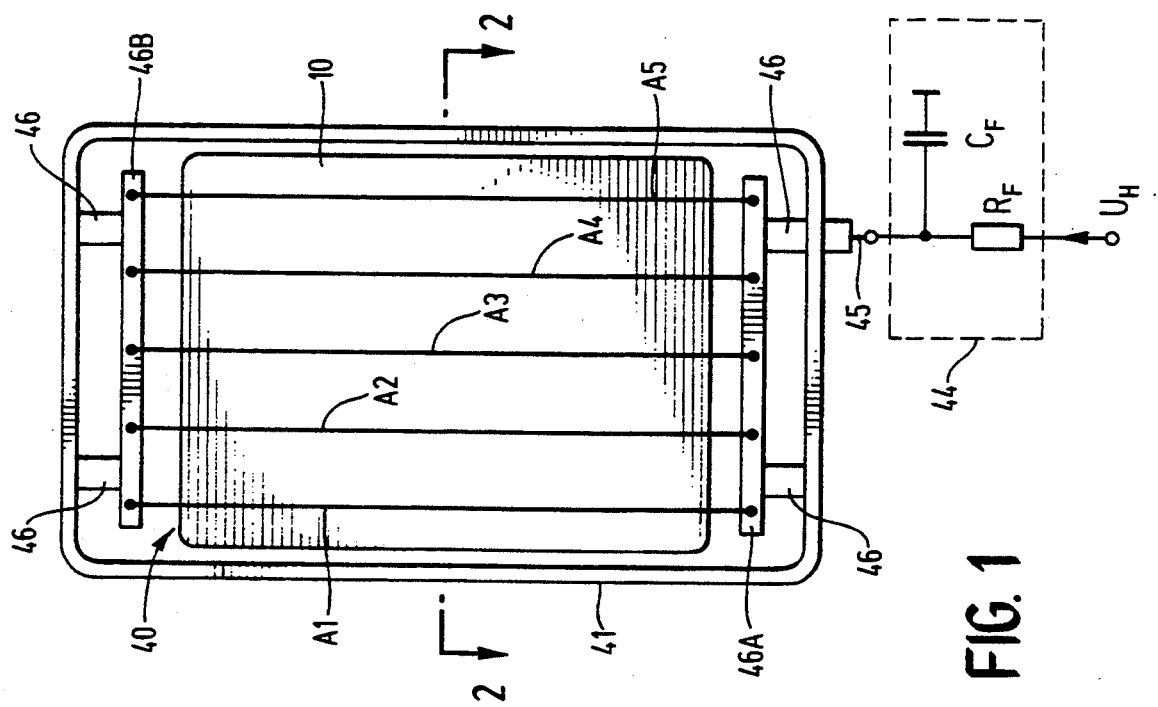

FIG. 1 shows a bottom view, and FIG. 2 a cross section through the plane 2—2 of FIG. 1, of a single counter illustrating the basics of the invention.

The structure shown in FIGS. 1 and 2 includes a counting tube housing 41 which encloses a counting chamber 40 on five sides. Depending on the radiation to be detected, chamber 40 can be open or closed off with a foil or with a potential grid towards the bottom in the direction towards the sample 50. The bottom defines a radiation-receiving window. The housing 41 is grounded and is used for shielding the counting chamber 40 against external interference effects and for maintaining the geometry of the electrical field in the counting chamber.

A total of five anode wires A1 . . . A5 are stretched parallel to one another and to a long side of the housing 41 via insulators 46 on the housing 41 and conductive distributor strips 46A, 46B. The anode wires are connected to a source of high voltage $U_H$ via a connector 45 and a low pass filter 44 consisting of a resistor $R_F$ and capacitor $C_F$. It is of particular importance that the connector 45 is connected only to the high voltage supply and is not used for picking up counting pulses, such as in conventional counting tubes. The anode wires A1 . . . A5 are grounded with respect to pulses via the capacitor $C_F$, so that the possibility of interference pick-ups because of insulation defects in the high voltage part is prevented.

In accordance with the invention, a plate-or disk-shaped cathode element, hereafter referred to as cathode pad 10, used for picking up the counting pulses, is located parallel to the back, i.e. on the interior wall of the counting tube housing 41 which faces, and is opposite to, the sample 50. Such a cathode pad 10 consists of a lower conductive surface 10A (cathode surface) facing the anode wires, and a support 10B of an insulating material carrying conductive surface 10A. In the simplest case, here illustrated, the support 10B is a printed circuit board with the cathode surface 10A laminated on its underside. A connector on the top of the support plate 10B for connection to surface 10A can be realized by a metal-coated bore in support plate 10B. A contact 42 (for example a plug element) is connected to this connector and is brought through a bore 41A in the counting tube housing 41 to the exterior.

Figure 5:
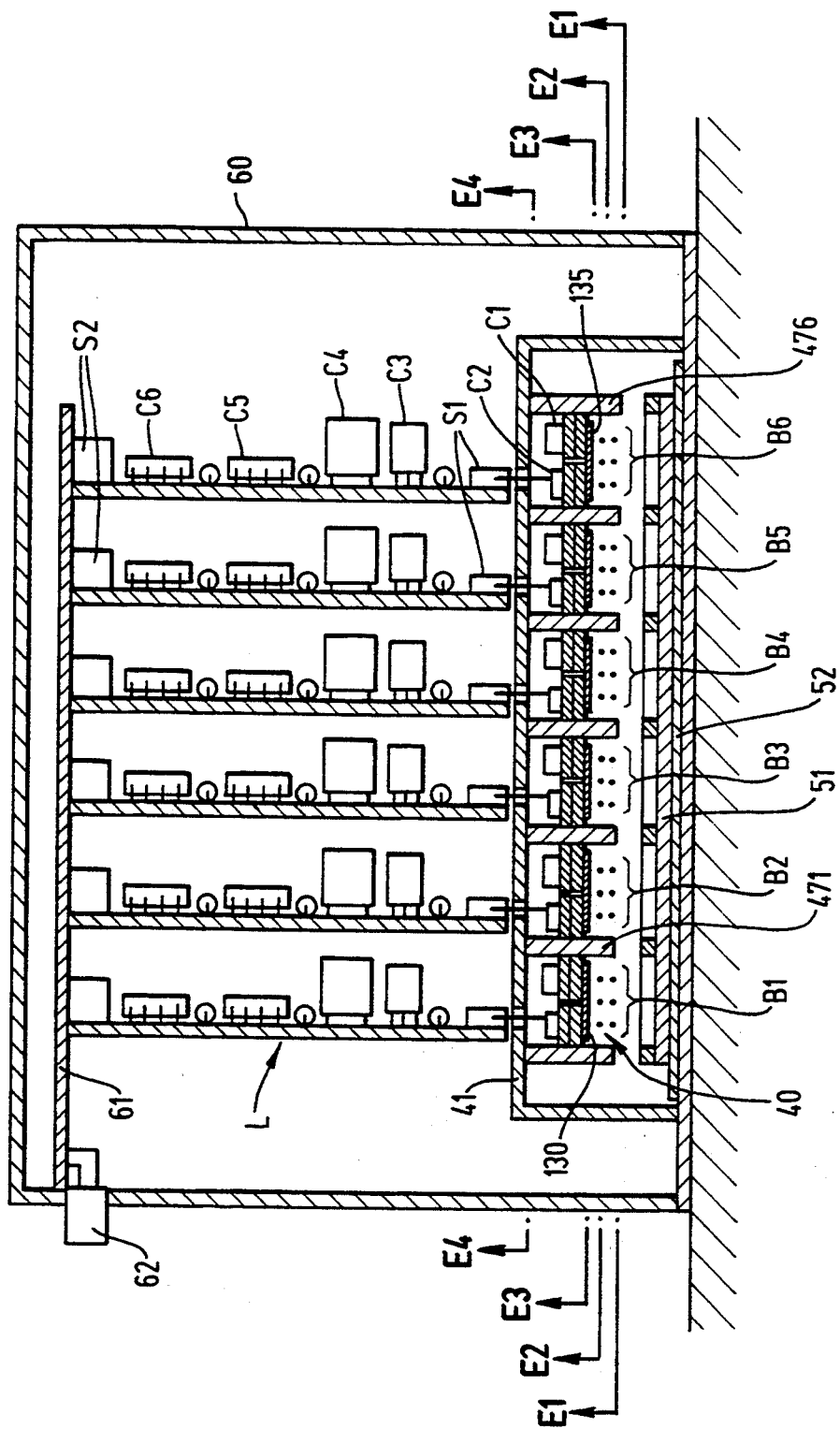

However, it is also possible to use a printed circuit board laminated on both sides or having several layers (multi-layer) as the support plate, as shown in FIG. 5, where the top lamination can be embodied for forming strip connectors used for connecting electronic components and plug elements, and one of the middle layers can be used as a grounded area for shielding the cathode pads with respect to the electronic circuit.

It is assured in any case that the connection of the cathode pads to the allocated amplification circuits extends over the shortest distance. The very short conductor paths minimize the danger of electrical cross talk because of capacitive coupling effects and insertion of external interference.

An input circuit 4 essentially consists of an amplifier, preferably embodied to be charge-sensitive, by means of which the voltage increase at the cathode pad and thus the capacitive cross talk can be minimized.

The counting tube illustrated in FIGS. 1 and 2 is used as a single counter. For example, the schematically indicated sample 50 can be in a sample dish and the sample can be connected to a negative high voltage (approximately 1000 Volts) in order to achieve an increase in the detection sensitivity, particularly with low-energy $^3$H-or $^{14}$C-$\beta$ radiation, by pulling the secondary electrons into the gas amplification area around the anode wires.

It has been shown in a surprising manner that by means of the cathode pad in accordance with the invention it is possible to obtain counting signals of (positive) polarity of approximately the same pulse amplitude as with the yield of anode counting pulses by use of the anode wires A1 . . . A5 as counting wires.

As already mentioned, the employment of printed circuit board technology which has become possible as a result of this concept and the advantages achieved thereby, including embodiment of the cathode pad as a part of multi-layer printed circuit boards with printed circuits, along with the integration of strip conductors and electronic components, simple connecting technology, and extremely space-saving construction, can be beneficial for the construction of multiple counting tubes, where the sample area to be measured consists, for example, of sample dishes disposed in a matrix-like manner, as in the device of the prior art, for example so-called micro-titer plates comprising 8×12 sample dishes.

Figure 3:
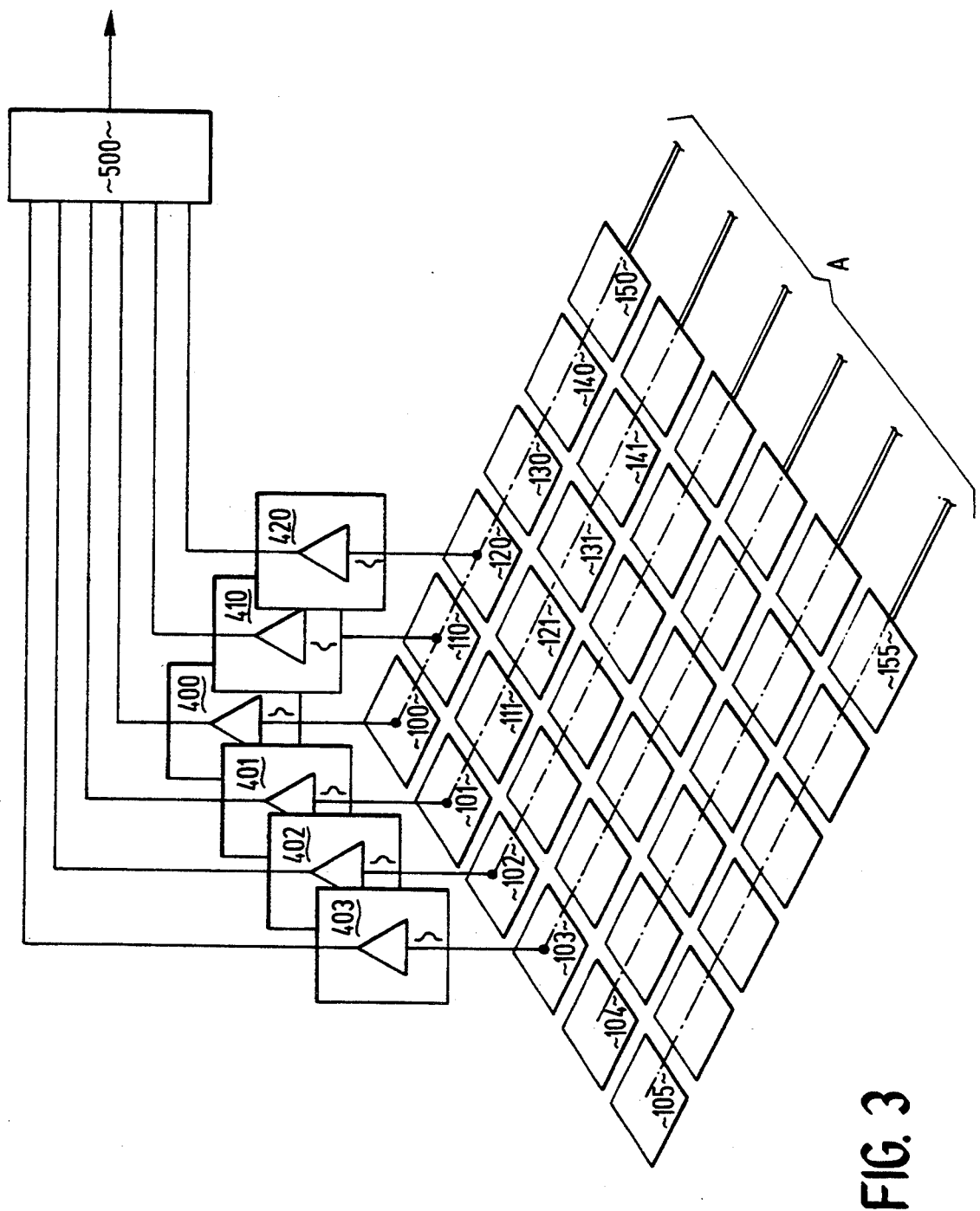
FIG. 3 is a schematic view of a first exemplary embodiment of a multiple counter according to the invention with direct read-out.

FIG. 3 shows a schematic view of a multiple counter or a large area counting tube with cathode pads 100 . . . 155 in a matrix arrangement (6×6=36 cathode pads), where each row of six cathode pads extends along a respective one of several anode wires A. An individual amplification-discrimination circuit 400 . . . is allocated to each one of these cathode pads, with the aid of which each radiation event taking place in the area on an anode wire under an allocated cathode pad is registered and passed on to a common evaluation circuit 500. In this case the electronic expenditure is relatively great because of the required large number of amplification discrimination circuits 400 . . . . However, this type of direct parallel evaluation of all counting pulses is the fastest and does not require any further circuit stages in the evaluation circuit 500 to identify the cathode pad from which the counting pulse originates, such as is the case with coded read-out, explained below. A multichannel counter essentially is sufficient as evaluation circuit 500, the number of channels of which corresponds to the number of amplification-discrimination circuits allocated to the cathode pads.

FIGS. 4 and 5 show a preferred exemplary embodiment of a multiple counter which in this case is used to detect radioactivity coming from discrete samples in a sample holder 51. The sample holder 51 is seated on an insulated base 52 on the bottom of the housing 60 of the multiple counter, so that the sample holder can have a (negative) potential different from that of the housing, which can be used to increase the detection sensitivity.

The 6×6 cathode pads 100 . . . 155 are disposed in a matrix pattern inside of the counting chamber 40; the left row in FIG. 4 thus contains the cathode pads 100, 110, 120, 130, 140, 150, and the last, right, row contains the cathode pads 105, 115, 125, 135, 145, 155. A group of anode wires A1, A2 . . . A6, which are connected to a source of high voltage via a connector 451 and distributor strips, is allocated to each column of cathode pads. Below each group of anode wires A1 . . . A6 is a group of potential wires B1 . . . B6, which are preferably connected with ground and are used to improve the field geometry in the counting chamber.

The first group of anode wires A1 thus is located under the cathode pads 100, 110, 120, 130, 140, 150, the last group A6 under the cathode pads 105, 115, 125, 135, 145, 155. To prevent cross talk effects between adjoining rows of cathode pads, each one of these groups is shielded from the adjoining group by a separating wall 470 . . . 476 of a conductive material extending parallel to the anode wire groups and perpendicular to the plane of the cathode pads. The separating walls 470 . . . 476, however, are also used to receive the printed circuit boards with the cathode pads by means of beads or grooves on the edges. The cathode pads 100 . . . are connected via metal-coated bores with the top of the printed circuit boards, the electrical connection to the electronic components C1, C2 (for example input amplifiers) being made via strip conductors and/or plug connectors S1.

The remaining parts of the amplifier-discrimination circuits 400 . . . 455 can also be realized on additional printed circuit boards L, which support the required electronic components C3 . . . C6 and which are connected via the plug connector S1 (for example so-called plug post connectors) on the one side with the electronic components C1, C2 on the printed circuit board and via plug connectors S2 on the other side with an upper printed circuit board 61 and in this way form the identically constructed amplifier circuits 400 . . . shown schematically in FIG. 3. The amplifier signals can be supplied via an output bus 62 to the external evaluation circuit 500.

With this structural design of the preferred exemplary embodiment it becomes clear that each sample dish on the sample holder 51 has "its own" allocated counting channel, starting with the cathode pad adapted in its shape and size to the sample dish to be measured and ending with the processed counting pulse which can be picked up at the output 62.

Figure 4A:
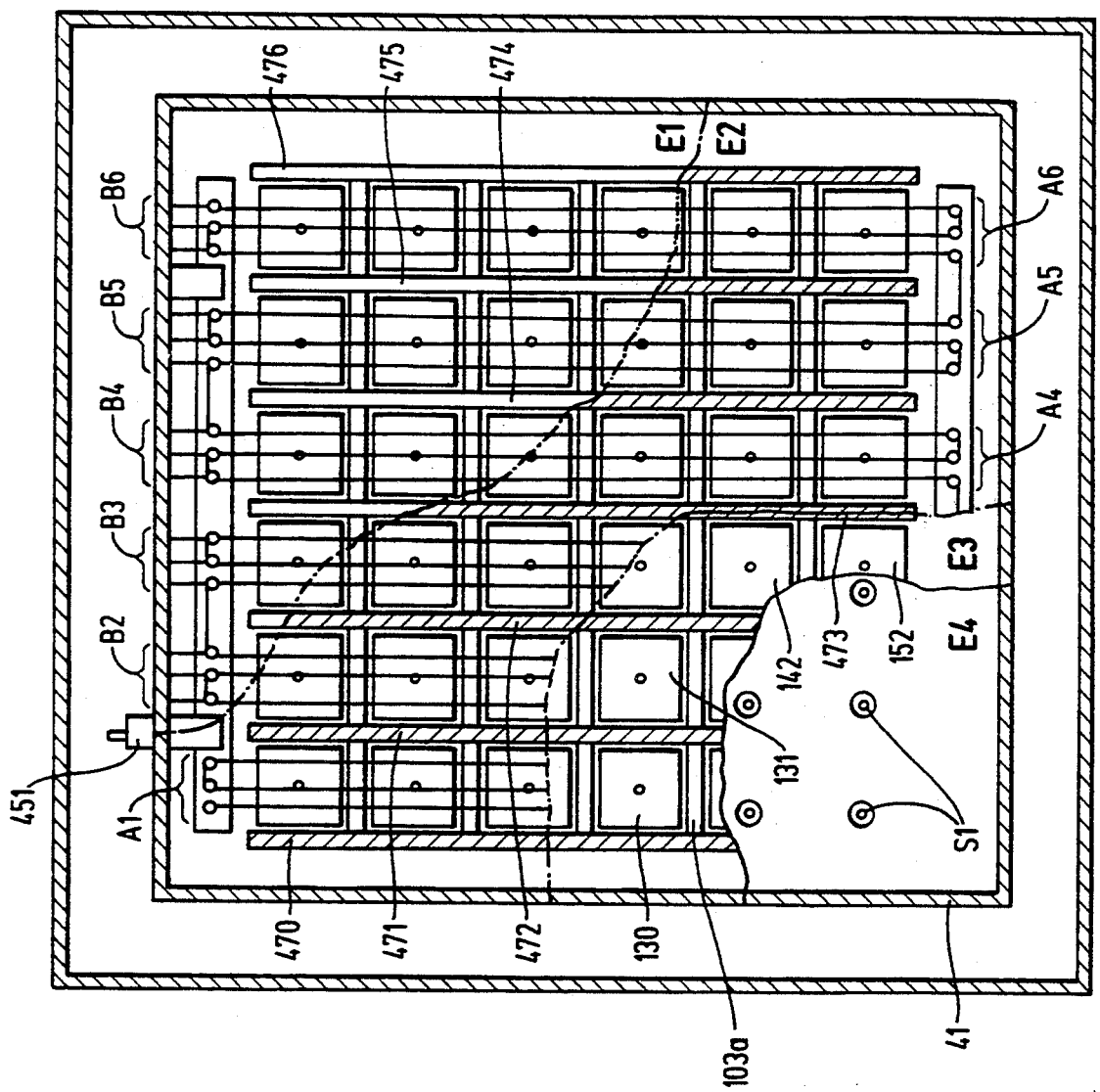
FIG. 4A shows several horizontal sections in the planes E1 . . . E4 of FIG. 5.

In this case the printed circuit board technique permits a very space-saving embodiment. A possibility for eliminating electrical cross talk should be pointed out in particular, namely the embodiment of so-called "guard strips", one of which is shown in FIG. 4A at 103a, in the form of strip conductors either connected to ground or to another auxiliary potential. These guard strips are located between cathode pads; in some embodiments, such as in the above-described large area counting tube, such guard strips can enclose the cathode pads on all sides.

To make the structure of the multiple counter clearer, FIG. 4A shows several horizontal sections in different planes, where the direction of view is from the side of the samples.

Plane E1 is on the level of the potential wire groups B1 . . . B6 which are supported on distributor strips and connected with the housing 41 and are therefore grounded together with housing 41.

Plane E2 is on the level of the anode wire groups A1 . . . A6, which are connected with each other via distributor strips and electrically connected with the high voltage connector 451.

Plane E3 is on the level of the undersides of the cathode pads 100 . . . 155, some of which are identified by their reference numerals.

Plane E4 finally is on the level of the horizontal rear wall of the housing 41 and has bores corresponding to the bore 41A in FIGS. 1 and 2 with plug connectors S1 extending through them.

Figure 6:
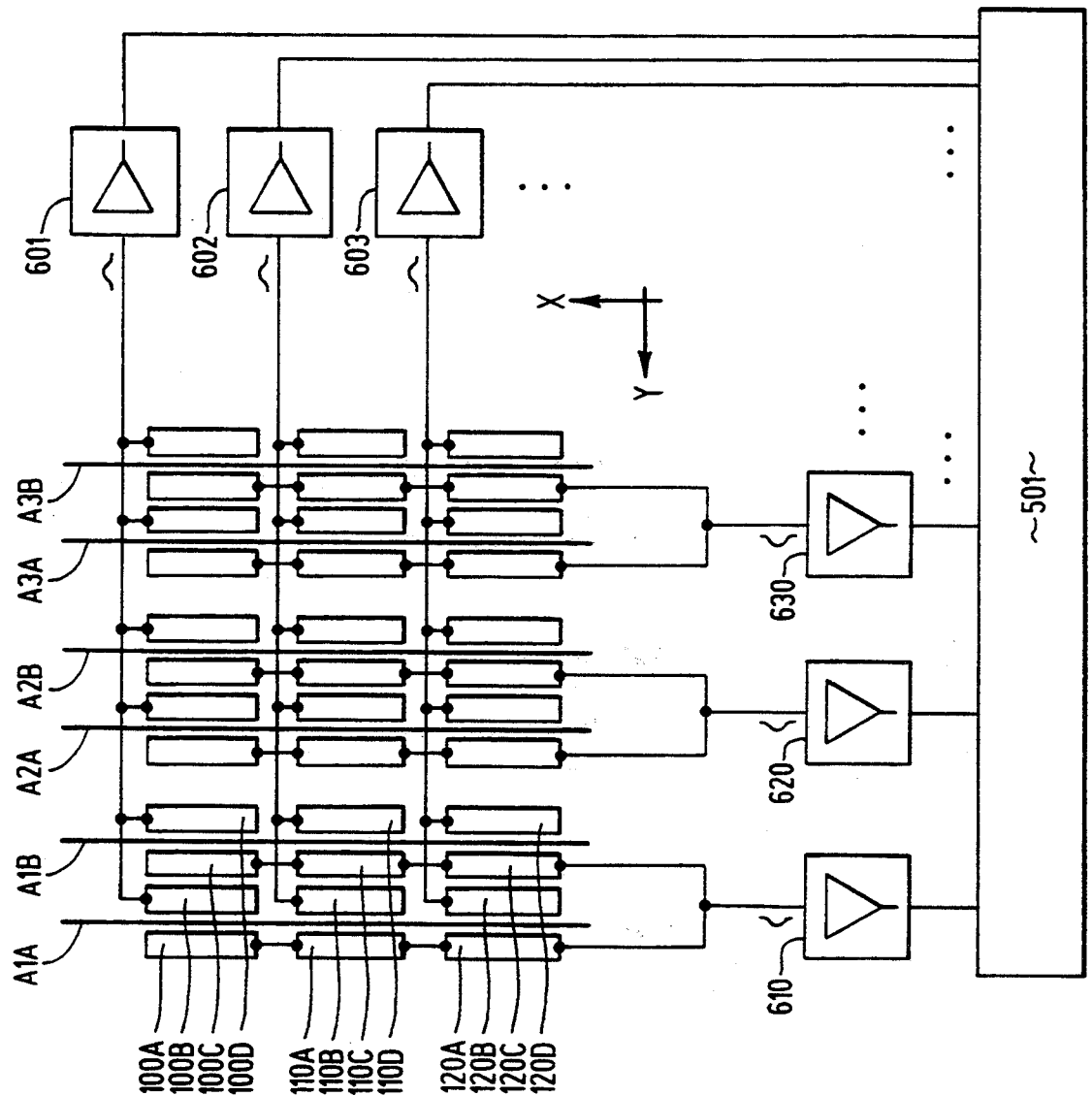
FIG. 6 is a schematic view of a second exemplary embodiment of a multiple counter according to the invention with coded read-out.

In place of direct, parallel read-out of each cathode pad, described in connection with the exemplary embodiment described above, it is also possible to perform a coded read-out of the cathode pad pulses, as shown schematically in FIG. 6.

For this it is basically necessary to divide each cathode pad allocated to a partial area to be measured into at least two parts or to provide additional cathode pads, because at least one cathode pad each is needed for obtaining X-location information and Y-location information. Advantages and disadvantages of coded evaluation can be seen directly from a comparison of FIG. 3 with FIG. 6. While with direct read-out m×n (=36 in the exemplary embodiment) separate amplifier circuits are required, coded read-out only requires m+n (=12) such amplifier circuits 601 . . . , and thus only a third of the respective electronic expenditure. However, in contrast to the evaluation circuit 500 of FIG. 3, in the course of coded read-out the evaluation circuit 501 of FIG. 6 requires additional electronic components for decoding of the arriving counting pulses, i.e. as a rule coincidence circuits which, in case of a simultaneous arrival of signals from one of the pulse evaluation circuits in both the X- and Y-directions, determine the x-y-coordinates of the allocated sample position.

It is basically necessary to assure that the allocation of the (partial) cathode areas to the anode wire, or anode wires, or anode wire groups A1, A2, A3 is also such that a counting event in the area of an anode wire or wires results in counting pulses of approximately the same strength being induced in the X-cathode partial area and Y-cathode partial area. As can be seen in FIG. 6, the two halves, 100A, 100C; 100B, 100D, of a cathode pad are arranged symmetrically to the allocated anode wires, A1A, A1B, to meet this requirement.

The pad halves 100B, 100D . . . , 110B, 110D . . . , 120B, 120D . . . located to the right of the associated anode wires A1A, A1B . . . are connected together in rows in a direction crosswise to the anode wires and each row is allocated to a respective amplifier circuit 601 . . . to obtain the y-coordinate. The pad halves 100A, 100C . . . , 110A, 110C . . . , 120A, 120C . . . located to the left of the anode wires are connected with each other in columns in the direction of the anode wires and each column is connected to a respective amplifier circuit 610 to obtain the x-coordinate.

FIGS. 7 and 8 are schematic views of further possibilities for coded read-out in respect to the structural design of the cathode pad segments on the one hand and their allocation to the anode wires on the other.

In place of a division of the cathode pads disposed on the counting chamber rear wall (FIG. 6), in the exemplary embodiment of FIG. 7 additional vertical cathode pad planes are provided perpendicular to rear cathode pads 100, 101 . . . 120, shown as squares in FIG. 7, which are connected together in columns in the direction of the anode wires for obtaining the X-coordinate information. Vertical cathode pads 102V . . . 132V, embodied as side areas and respectively extending on both sides of each of the rear cathode pads, are connected, crosswise to the anode wires, for obtaining the Y-coordinate information. In this exemplary embodiment it is also possible to realize the cathode pads 100 . . . 122, which have been shown to be separated, as three cathode pad strips parallel to the anode wires. Here, two respective anode wires are provided for each anode wire group A1 . . . A3 to assure even coupling-in of the counting pulses into the surrounding cathode pads.

Finally, in the exemplary embodiment of FIG. 8 the vertical cathodes are embodied as continuous cathode strips V11 . . . V32 providing Y-coordinate information and the allocation of the X- and Y-coordinate information is reversed. Insulating areas M1, M2 are inserted between the cathode walls of adjoining columns.

It should be stressed that the principle of coded read-out can be particularly advantageously converted to exclusive use of cathode pads.

Figure 9:
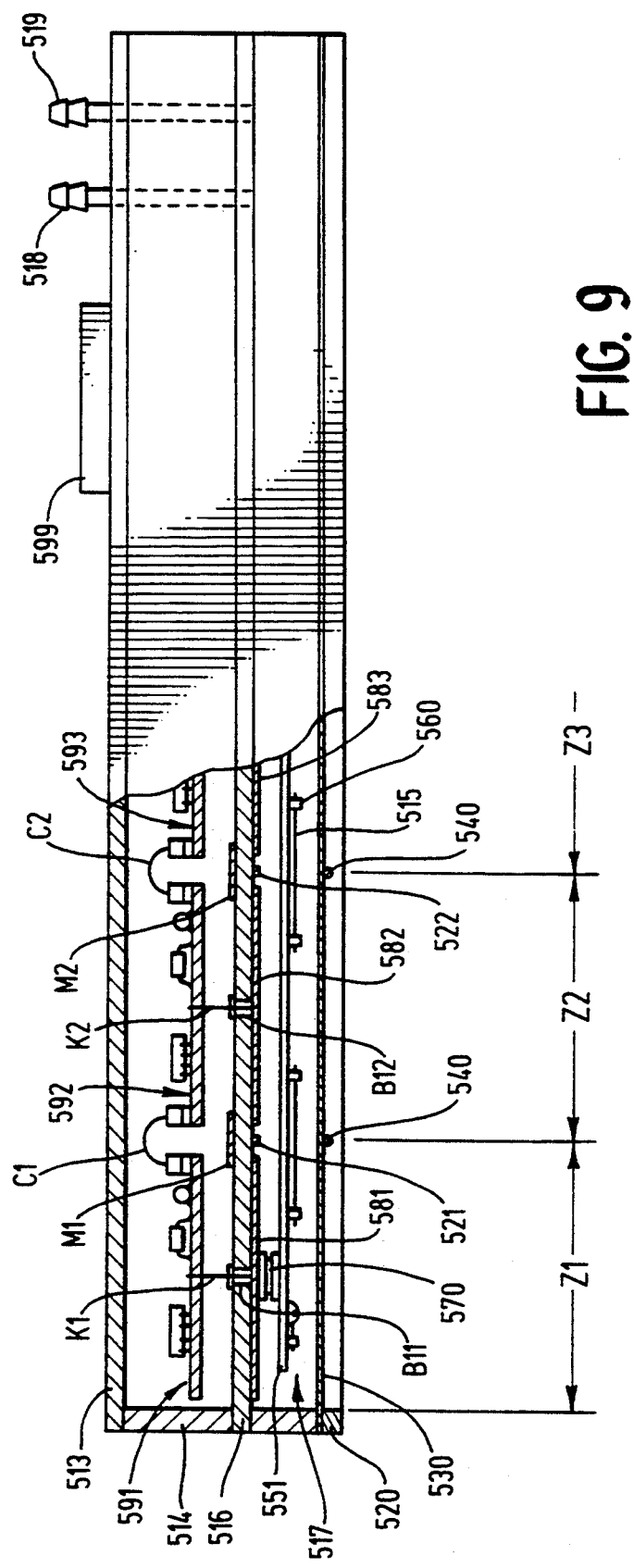
FIGS. 9 and 10 show a third exemplary embodiment of a multiple counter according to the invention in a sectional and a bottom view, respectively.
Figure 10:
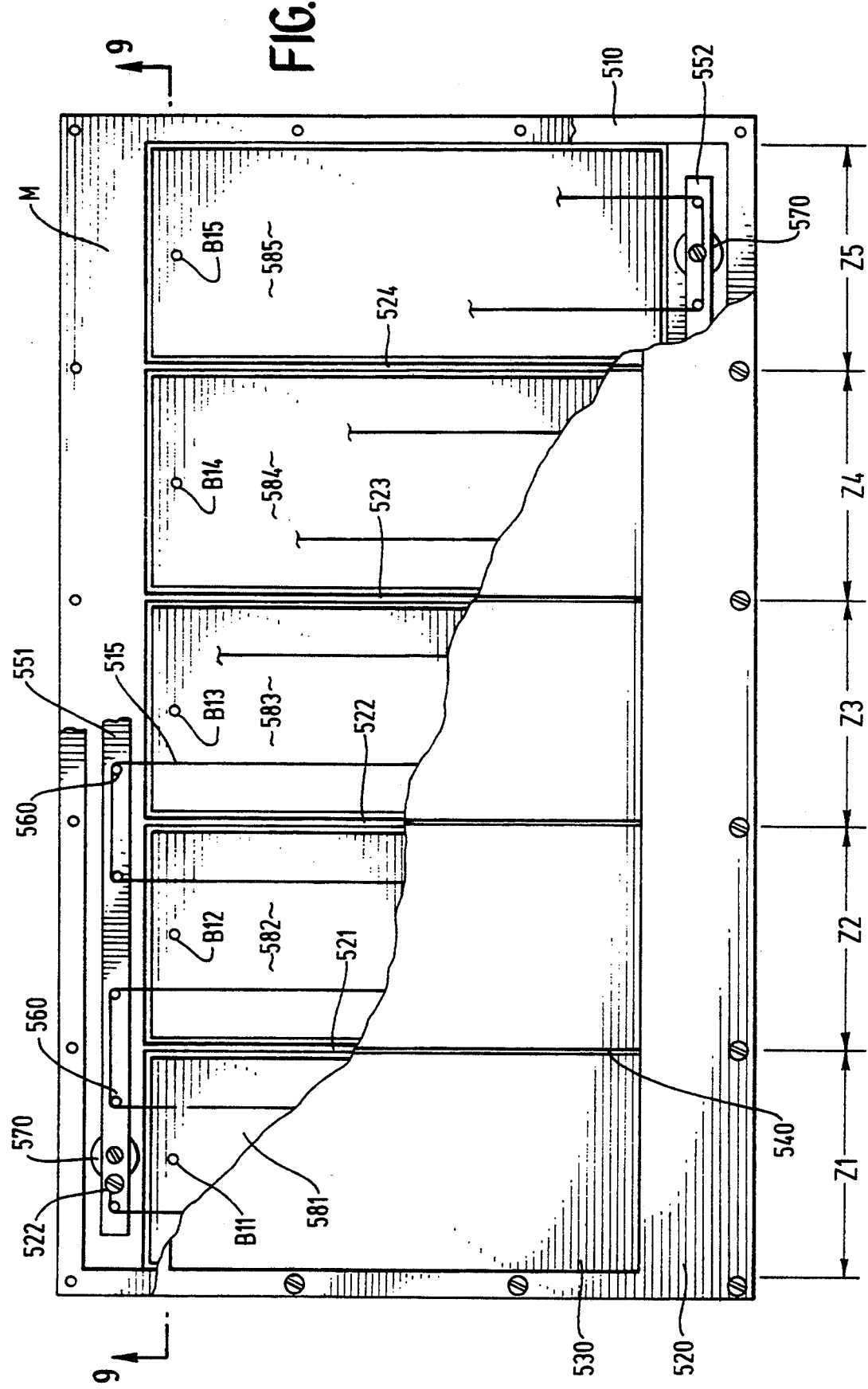

The multiple counter shown in FIGS. 9 and 10 is a large area flow-through counting tube, such as can be used in contamination monitors, for example floor contamination monitors, whole body monitors or waste monitors. It is used for simultaneous and separate measuring of $\alpha$- and $\beta$-rays.

The multiple counter in accordance with FIGS. 9 and 10 is divided into five identically constructed sections Z1 . . . Z5, each having an area of approximately 100 cm$^2$. In this case each section contains a part of the active counting tube volume 517, from which the counting tube signals allocated to the respective sections are coupled. The construction of this multiple counter will now be described from the bottom to the top in FIG. 9.

The lower end of the counter is formed by a window foil 530, for example a plastic foil metal-coated at least on the inside. A surrounding frame 520 with crossbars 540 embodied as wires inserted into the frame is used for supporting this window foil 530. The window foil 530 constitutes the lower end of the counting tube volume 517, the lateral limits of which are formed by a surrounding metal frame 510. The rear wall of the counting tube volume 517 located opposite the window foil 530 is formed by a base plate 516 of an electrically insulating material. A further surrounding frame 514 is disposed on this base plate 516 and is closed off at the top with a cover plate 513. The volume enclosed by the top of the base plate 516, the surrounding frame 514 and the cover plate 513 is used to receive the electronic evaluation element or the signal evaluation circuits provided for this, which will be explained in detail below.

Corresponding to the five sections Z1 . . . Z5 into which the multiple counter is divided, there are five closely adjoining rectangular cathode elements 581 . . . 585 on the underside of the base plate 516, which are separated from each other by narrow grounded metal strips 521 . . . 524 which, in turn, terminate in an exterior border M at opposite sides of the five cathode elements 581 . . . 585. The five cathode elements are separated electrically from each other in this way by the grounded area M and the connecting bars 521 . . . 524.

The realization on base plate 516 of the cathode elements 581 . . . 585 and the surrounding grounded areas M and 521 . . . 524 takes place (as in the exemplary embodiments already described above) in a simple and practical manner in the form of a printed circuit board, such as is conventionally employed for producing electronic circuits. In the exemplary embodiment, the strips 521 . . . 524 have been chosen to each be approximately 1 to 3 mm wide.

This design avoids dead spaces between the individual detectors constituted by the individual sections Z1 . . . Z5 of the multiple counter.

Additional shielding with respect to the evaluation circuit located on the top is provided by grounded strips M1 . . . M4 on the back of the base plate 516, i.e. on the opposite side of base plate 516 from cathode elements 581–484. Grounded strips M1–M4 are disposed approximately opposite the strips 521 . . . 524 and are approximately 1 cm wide.

A total of four insulating elements 570 is disposed in the corner areas of the base plate 516. Insulating elements 570 support two bar elements 551, 552 which extend parallel to the long sides of the multiple counter. Bar elements 551, 552 have rivet heads 560 and a clamping screw 522 for fastening an anode wire 515. This exemplary embodiment provides a single anode wire 515, which is allocated to the five cathode elements 581 . . . 585 in such a way that two respectively parallel extending anode wire sections, which extend parallel to the long edges of the cathode elements, are allocated to each cathode element 581 . . . 585. This is achieved by guiding wire 515 around the rivet heads 560 which are disposed on bars 551, 552 at approximately uniform intervals and across which the anode wire 515 is guided along a meandering path. In this way the anode wire sections are stretched in the desired manner in the counting tube volume 517 between the inlet window 530 and the cathode elements.

Because the anode wire 515 is not used to couple signals out, high voltage capacitors can be omitted.

Supply of the anode voltage is provided to anode wire 515 via one of the insulating elements 570, which is embodied as a pass-through insulator.

Connection of the counting tube volume 517 to the counting gas supply is provided via connectors 518 and 519 inserted into the base plate 516.

Connection of the cathode elements 581 . . . 585 to the electronic evaluation element housed above the base plate 516 is provided via metal-coated bores B11 . . . B15 in the base plate 516 and contact plugs K1 . . . K5 inserted therein, which lead directly to the pulse inputs of the amplifiers on the signal evaluation circuits 591 . . . 595. Each one of the signal evaluation circuits of the electronic evaluation element is designed in the form of a printed circuit. The lower side of the printed circuits facing the counting tube volume 517 is embodied as a continuous grounded surface for shielding in respect to the cathode elements 581 . . . 585.

The signal evaluation circuits 591 . . . 595 are connected with each other via connecting elements C1 . . . C4 and also with an external connecting plug 599. Via the latter, the required operating voltages are supplied, and the output signals of the discriminators of the signal evaluation circuits are conducted out for further processing.

The housing constituted by the surrounding frame 514 and the cover plate 513 is electrically shielded in a suitable manner for shielding the pulse amplifiers and discrimination circuits contained in the signal evaluation circuits.

Figure 11:
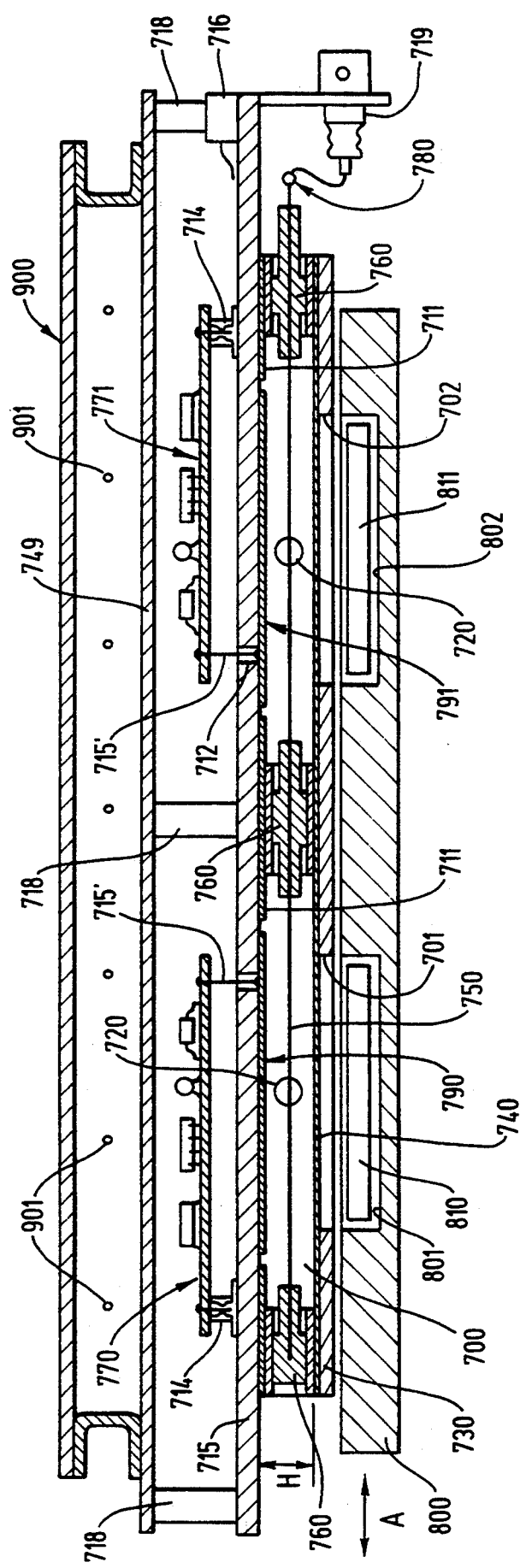
FIGS. 11 and 12 show a fourth exemplary embodiment of a multiple counter according to the invention in a sectional and a bottom view, respectively.
Figure 12:
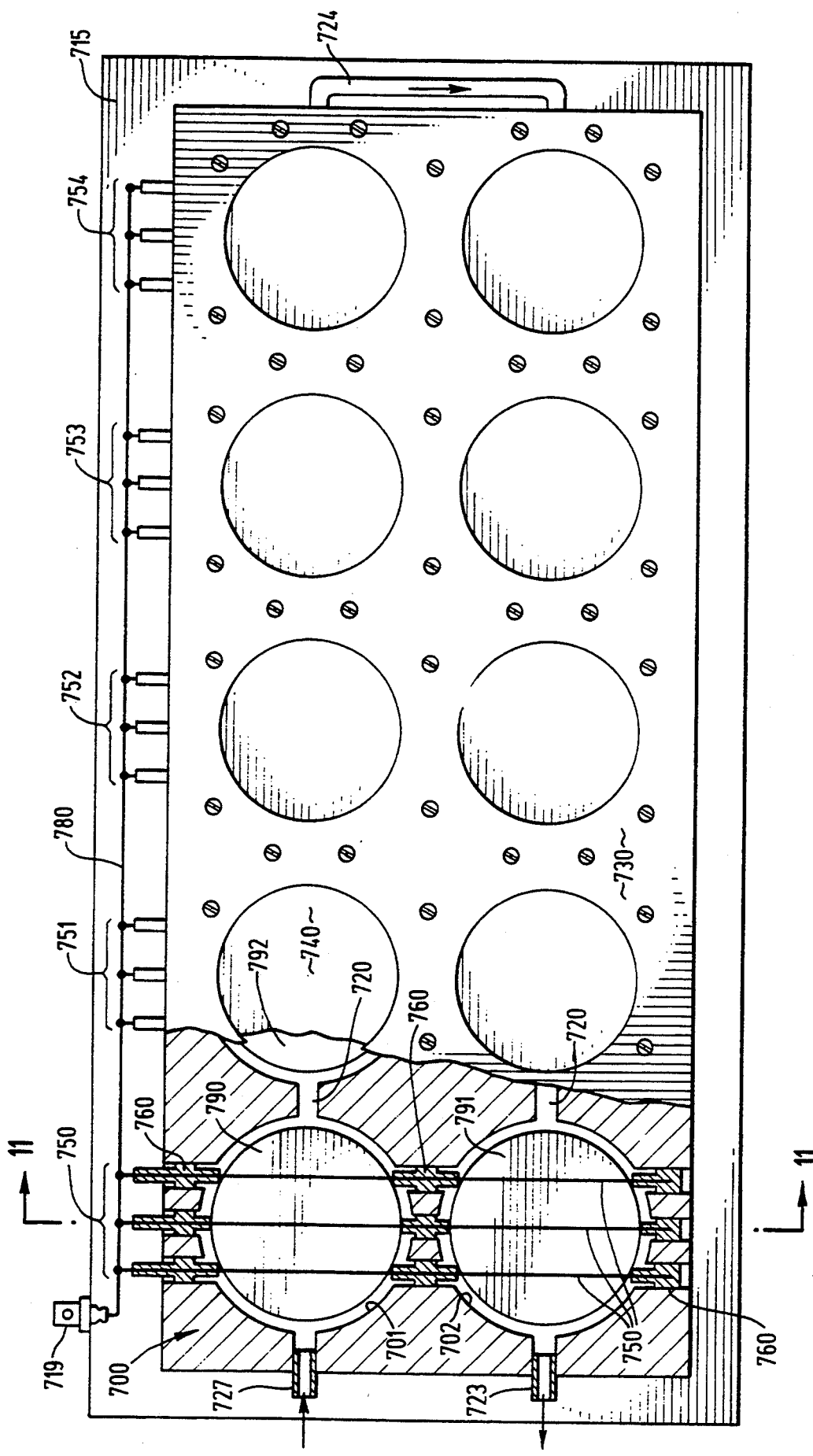

The fourth exemplary embodiment of a multiple counter illustrated in FIGS. 11 and 12 is a tenfold-flow-through counting tube for simultaneous measurement of up to ten discrete samples. In connection with a shielding of lead (not shown), such a detector arrangement is suited for low level measurements. The electronic evaluation element in this case is designed for the simultaneous and separate measurement of $\alpha$- and $\beta$-activities.

First, the mechanical structure of this multiple counter will be described from the bottom to the top in FIG. 11.

In the exemplary embodiment of the multiple counter shown, a counting tube body 700 of low-activity electrolyte copper is used to form the counting tube volume of ten measuring counting tubes delimited by ten circular holes 701 . . . 710, which are arranged in two parallel rows and delimit measuring areas. The thickness of counting tube body 700 and the height H of the counting tube volume formed by this is approximately 6 to 8 mm to achieve as low as possible a background noise.

A lower cover plate 730 with a window foil 740, of a plastic foil which is provided with a metal-coating at least on the inside, is used as the lower end of the ten counting tube volumes which have been formed. The upper end of the counting tube volumes is formed by a support plate 715, so that ten circular counting tube volumes are created.

For the common counting gas supply, two counting volumes located at the front end of the counter are connected to the counting gas supply by means of connectors 723, 727, and adjoining counting tube volumes are connected via connecting bores 720, so that two adjoining rows of bores are connected with each other. At the end opposite the connectors 723, 727, the two rows of bores are connected with each other by means of a U-shaped connecting line 724, so that counting gas flowing in via the connector 727 flows through all ten counting tube volumes successively and leaves the detector through the connector 723.

The counting tube body 700 constructed massively in this manner forms an effective shielding of the individual counting tube volumes against the radioactive radiation in adjoining counting gas volumes.

In this exemplary embodiment, a respective group 750 . . . 754 of three anode wires each is allocated to each two adjacent counting tube volumes. The anode wires extend parallel to the short side of the multiple counter and pass through the counting tube volumes in such a way that the distance between the center anode wire of each group and the parallel extending anode wire on either side corresponds to one-fourth to one-sixth of the diameter of each of the counting tube volumes, i.e. of each hole 701–710. Insulating elements 760 are pressed into appropriate bores for fixing the anode wire groups 750 in the counting tube body 700. In this case the insulating elements 760 between associated counting tube volumes and at one side of the associated counting tube volumes are pass-through insulators and all anode wires (a total of fifteen in the exemplary embodiment) are connected with each other on a long side of the multiple counter by means of a common line 780 and by means of a plug connector 719 with the high voltage supply, so that here the anode wires are connected electrically in parallel.

The cathode elements 790 . . . 799 provided for coupling out the signals (790 . . . 792 are visible in the drawing figures) are embodied to be circular and are of such size that they have almost the same diameter as the circular holes 701 . . . 710 of the counting tube body 700 which form the counting tube volumes. In this exemplary embodiment, too, the cathode elements are located on the underside of the support element 715 of an electrically insulating material. Here, too, to realize the cathode elements in the form of a support element 715, a copper-laminated printed circuit board is used, on which not only the desired circular cathode elements, but also the grounded area 711 surrounding them with a gap of approximately 0.3 mm, are realized by means of the same method as that used when producing printed circuit boards for electronic circuits.

Connection of the cathode elements 790 . . . 799 to the allocated electronic evaluation elements 770 . . . 779 (770 and 771 have been illustrated in FIG. 11) is provided here, too, via metal-coated bores 712 in the support element 715 and contact elements 715' inserted there. The signal evaluation circuits 770 . . . 779 of the electronic evaluation element are constructed the same way as described in the previous exemplary embodiments, so that they need not be explained in detail here. The output signals of the signal evaluation circuits 770 . . . 779 reach a connecting plug 716 via contact elements 714.

The electronic evaluation element is housed in a housing having wall elements 718 and an associated cover plate 749.

The cover plate 749 also forms the lower limit of the counting tube volume of a large area shield counting tube 900, which forms the upper end of the multiple counter herein described and which is provided with counting wires 901. This large area shield counting tube is used in particular for shielding against external radiation, so that the sensitivity of the multiple counter and thus its suitability for low level radioactivity measurements is improved.

In connection with such low level counting tubes, the signal read-out in accordance with the invention exclusively by means of cathode elements is particularly advantageous, because the probability of the appearance of interference pulses based on insulation defects of coupling capacitors is considerably reduced or practically completely eliminated because of the low-voltage supply of high voltage to the anode wires and by the elimination of coupling capacitors at high voltage which is possible because of the solution in accordance with the invention.

A sample slide 800 is provided with ten cylindrical recesses 801 . . . (801 and 802 are shown in FIG. 11) for receiving ten individual samples which can be measured with this multiple counter. The ten individual samples can be provided in a total of ten sample dishes 810 . . . 819 (810 and 811 are shown in FIG. 11) which can be inserted into recesses 810, 811, etc. For practical reasons the diameter of the cylindrical recesses 801 ... is substantially equal to the diameter of the circular openings in the cover plate 730 and thus equal to the diameter of the respective inlet windows of the individual counting tube volumes.

The sample slide 800 is designed to be displaceable in the direction of arrow A, and in its measuring position it can be placed close to the lower cover plate 730.

The allocation of each radioactive sample in a sample dish 801 ... to "its" counting tube volume permits a measurement which to a large extent is free of cross-talk effects based on the radiation from adjacent samples as well as from the effects of external radiation and which is therefore highly sensitive.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a multiple counter for detecting radioactive radiation from a radiation source, the counter including a plurality of electrically conducting flat cathode elements, a plurality of anode wires disposed between the radiation source and the cathode elements, and an electronic evaluation element connected to the cathode elements, the improvement wherein:
    each cathode element is operatively associated with at least two anode wires;
    said cathode elements are disposed and connected for exclusively effecting signal detection;
    said electronic evaluation element comprises a plurality of amplification circuits each connected to at least one respective cathode element; and
    said counter further comprises at least one printed circuit board constituting a support element carrying said cathode elements and at which said cathode elements are connected to said amplification circuits.

2. A multiple counter in accordance with claim 1, wherein each said amplification circuit comprises a charge- or current-sensitive input stage, said cathode elements are disposed at one side of said support element and said input stages are disposed at the opposite side of said support element from said cathode elements.

3. A multiple counter in accordance with claim 1, wherein each cathode element has a square or circular shape and a center line, and said anode wires associated with each said cathode element extend parallel to, and are arranged symmetrically with respect to, the center line of the associated cathode element.

4. A multiple counter in accordance with claim 1, further comprising devices for identifying and suppressing pulses induced by radiation which also induces pulses in other than said cathode elements, said devices including means connected for suppressing pulses which occur simultaneously in mutually adjacent cathode elements with the aid of anti-coincidence circuits.

5. A multiple counter in accordance with claim 1, wherein: the radiation source is composed of an array of localized radiation sources each associated with a respective cathode element; said radiation counter further comprises devices for suppressing pulses induced by radiation in a cathode element from a localized radiation source other than the localized source associated with that cathode element; and said pulse suppressing devices comprise radiation-absorbing intermediate walls.

6. A multiple counter in accordance with claim 1, further comprising: means defining a plurality of radiation measuring areas; and devices for identifying and suppressing pulses induced by radiation in a cathode element from a measuring area other than the measuring area associated with that cathode element; and wherein said pulse identifying and suppressing devices comprise strip conductors, and means placing said strip conductors at a selected potential.

7. A multiple counter in accordance with claim 6, wherein said pulse identifying and suppressing devices further comprise means connected for suppressing pulses which occur simultaneously in mutually adjacent cathode elements or strip conductors with the aid of anti-coincidence circuits.

8. A multiple counter in accordance with claim 1, wherein the radiation source is composed of an array of localized radiation sources; said cathode elements are arranged in a plurality of generally parallel rows; each cathode element is associated with a respective localized radiation source; and there are two respective anode wires associated with each cathode element row.

9. A multiple counter in accordance with claim 8, further comprising means defining a matrix composed of $m \times n$ circular measuring areas connected together by connecting bores; and wherein: said cathode elements are circular cathode elements each aligned with a respective circular measuring area and having a diameter less than the diameter of the respective circular measuring area; and said counter further comprises a window foil extending across said bores to separate said measuring areas from the radiation source, and means supplying a counting gas to said measuring areas.

10. A multiple counter in accordance with claim 9, wherein: there are ten said cathode elements arranged in a $2 \times 5$ matrix; there are three of said anode wires associated with each said cathode element and common to two of said cathode elements and extending across two of said circular areas, so that there are a total of fifteen anode wires; and all of said anode wires are connected to a high voltage connection.

11. A multiple counter in accordance with claim 10, further comprising a sample holder slidably movable into a detection position adjacent said means defining measuring areas, said sample holder having a plurality of recesses for holding sample receptacles, each said recess being located to be concentric with a respective circular area and cathode element when said sample holder is in the detection position.

12. A multiple counter in accordance with claim 1, wherein the radiation source is composed of a two-dimensional matrix arrangement of x rows and y columns of localized radiation sources each having a given effective area, the number of and surface area size of said cathode elements are related to the number of and effective area size of the localized radiation sources in such a way that, for coded read-out of radiation from one localized radiation source, at least two cathode elements are provided which produce signals to provide row and column location information by a coincidence evaluation, whereby the number of said amplification circuits corresponds to the sum of x and y.

13. A multiple counter in accordance claim 1, further comprising: a counting tube housing containing said anode wires and said cathode elements; a sample holder for holding a plurality of samples that jointly constitute the radiation source; and means for placing said housing and said holder at respectively different potentials.

14. A multiple counter in accordance with claim 1, constituting a two-dimensionally location-sensitive counting tube, where said cathode elements are dimensioned and positioned relative to one another to form a rough location grid of an order of magnitude in the millimeter range or greater.

15. A multiple counter in accordance with claim 1, wherein said plurality of anode wires are respective portions of a single anode wire arranged in a meandering form and composed of sections which extend parallel to and essentially equidistant from said cathode elements.

16. A multiple counter in accordance with claim 15, wherein there are n rectangular cathode elements arranged in a row and said single anode wire is disposed in such a way that two anode wire sections are allocated to each cathode element.

17. A multiple counter in accordance with claim 16, wherein each cathode element has a long dimension extending perpendicular to the row and said anode wire sections extend parallel to the long dimension of said cathode elements.

18. A multiple counter in accordance with claim 17 constituting a large area counting tube for measuring contamination, wherein each cathode element has an area of the order of 100 $cm^2$.

19. A multiple counter as defined in claim 1 constituting a low level radiation counting tube in combination with a large area shield counting tube mounted on said low level radiation counting tube for detecting interference radiation having an origin other than the radiation source.

20. The combination as defined in claim 19 further comprising shielding made of lead and disposed for at least partially blocking interference radiation.

21. A multiple counter as defined in claim 1 further comprising: a counter housing containing said cathode elements, said anode wires and said at least one printed circuit board; and connector means which pass through said housing for connecting said cathode elements to said amplification circuits.

22. A multiple counter as defined in claim 21 wherein each cathode element is disposed on one side of said at least one circuit board, and further comprising at least one additional circuit element mounted on the other side of said at least one board and connected by said connector means to at least one of said cathode elements.

23. A multiple counter as defined in claim 1 wherein there are a plurality of amplification circuits equal in number to the number of cathode elements and each amplification circuit is connected to one respective cathode element.

24. A multiple counter in accordance with claim 1 wherein all of said amplification circuits are structurally substantially identical to one another.

25. A counter for detecting radiation emanating from a two-dimensional surface, comprising: a housing defining a radiation receiving-window through which radiation passes from the surface when said housing is in a position for detecting the radiation; a single electrically conducting flat cathode element disposed within, and electrically insulated from, said housing, and facing the window, for providing a signal responsive to radiation from the surface; a plurality of anode wires disposed between said cathode element and the window; a single electronic signal evaluation element disposed outside of said housing; and a connector which passes through said housing to connect said cathode element to said signal evaluation element.

* * * * *